No. 768,665. PATENTED AUG. 30, 1904.
T. C. JOHNSON.
RECOIL OPERATED FIREARM.
APPLICATION FILED JUNE 29, 1903.
NO MODEL. 7 SHEETS—SHEET 3.
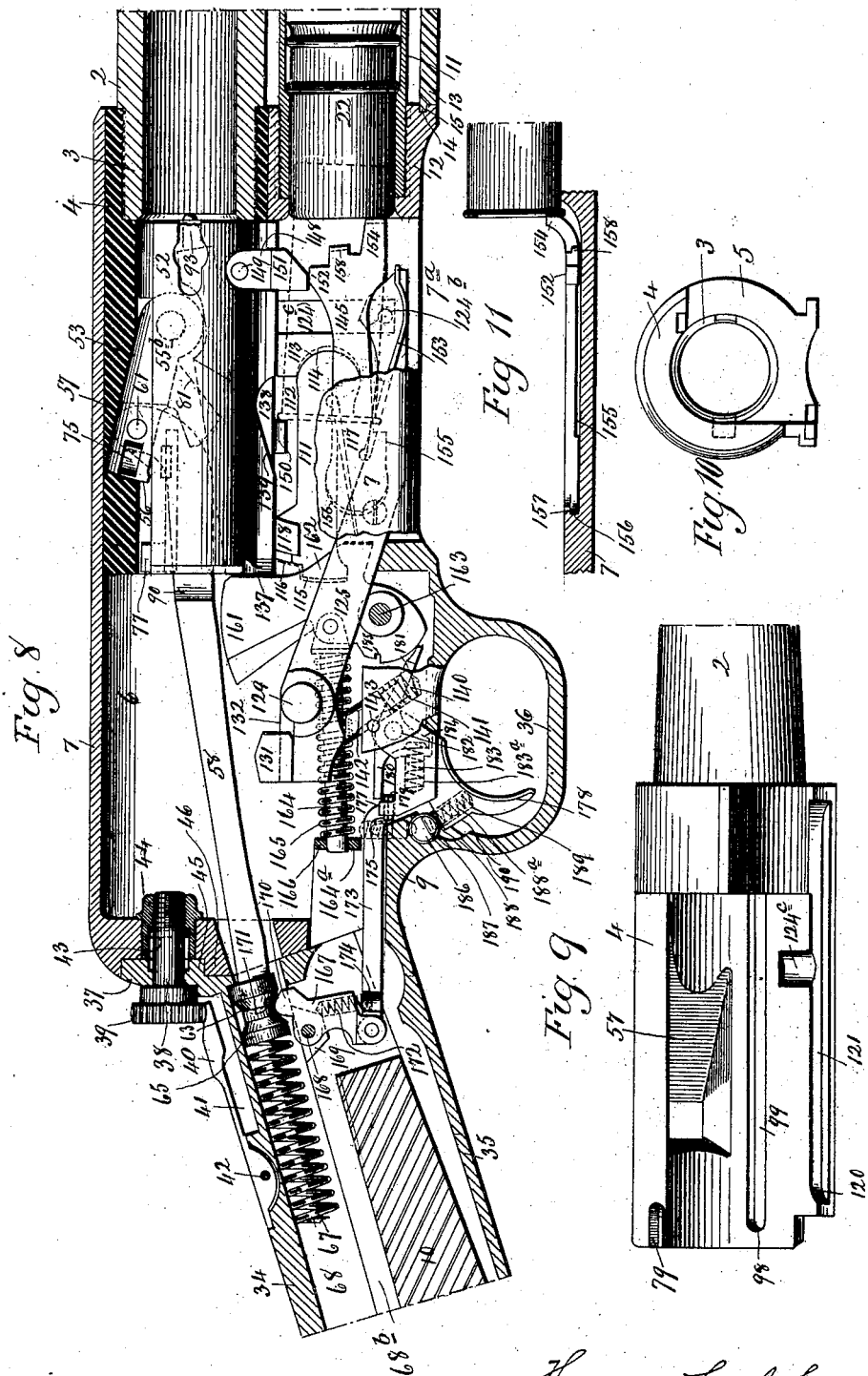

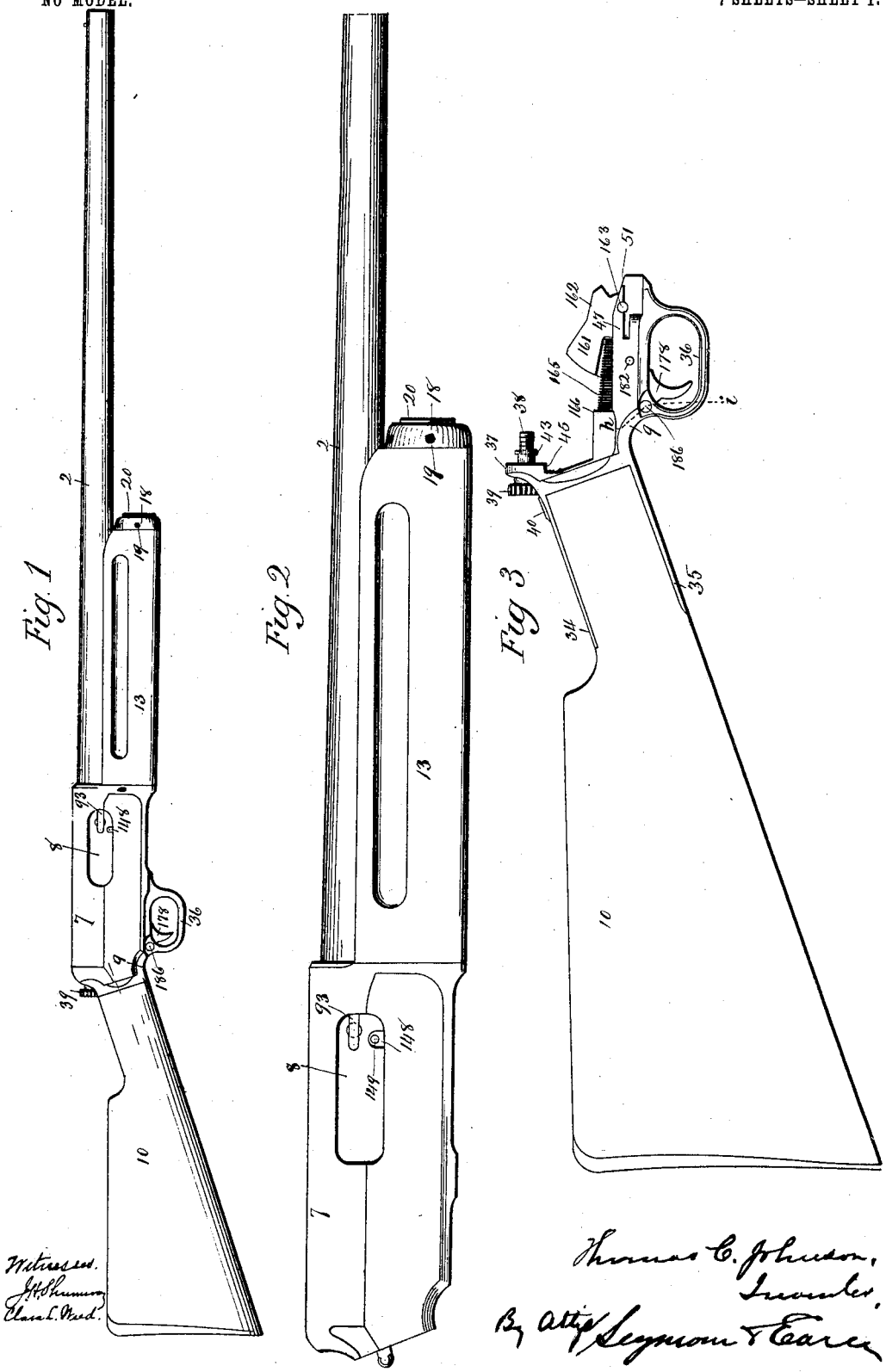

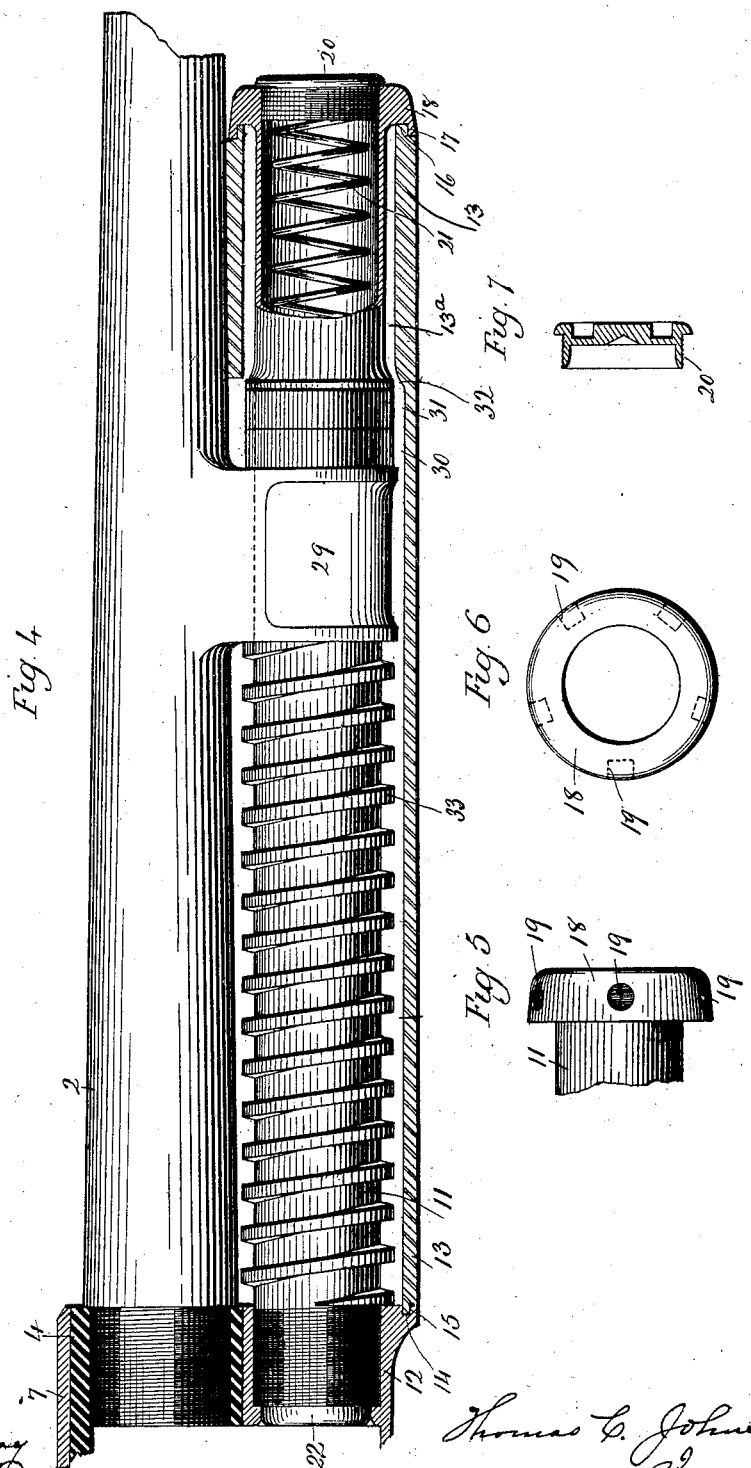

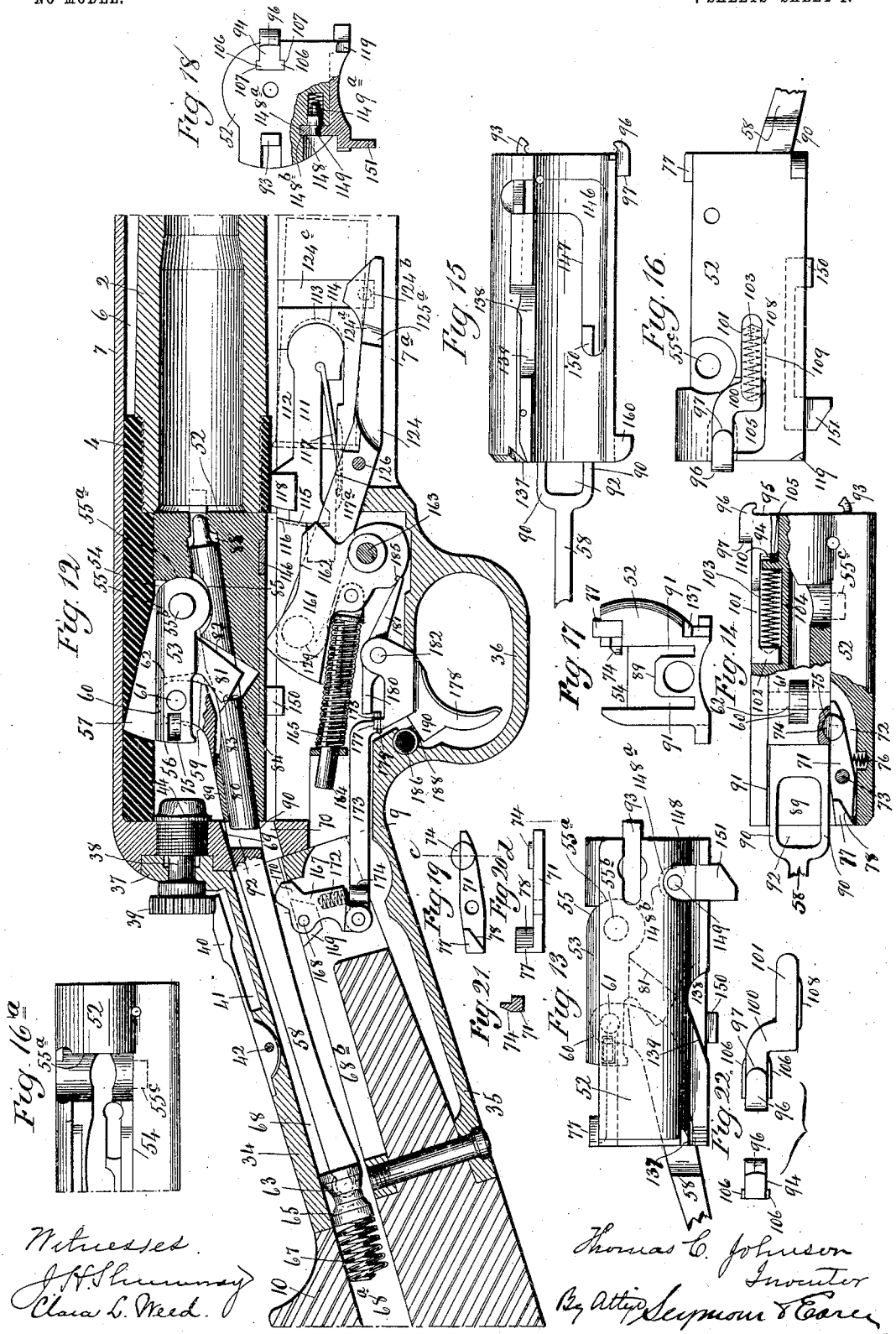

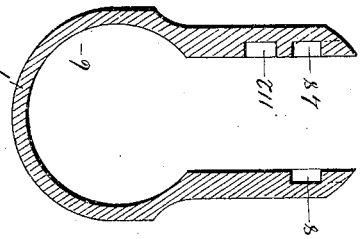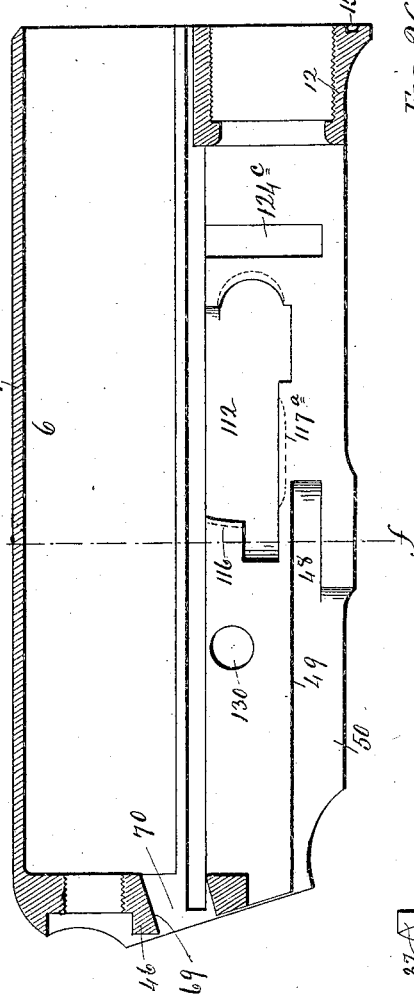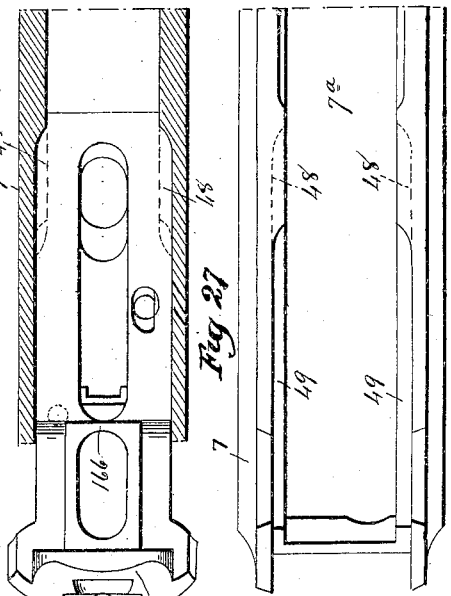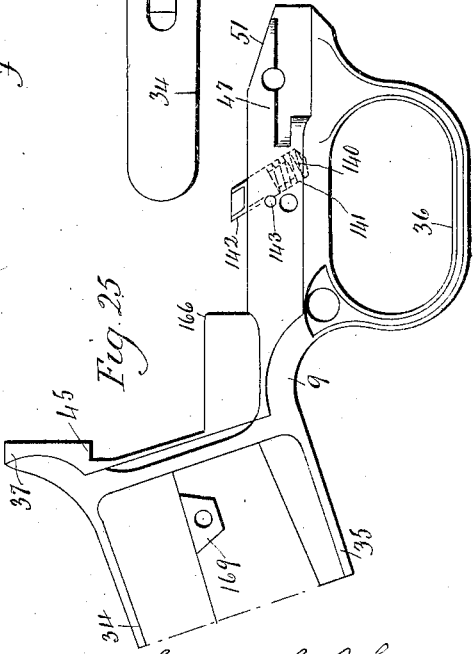

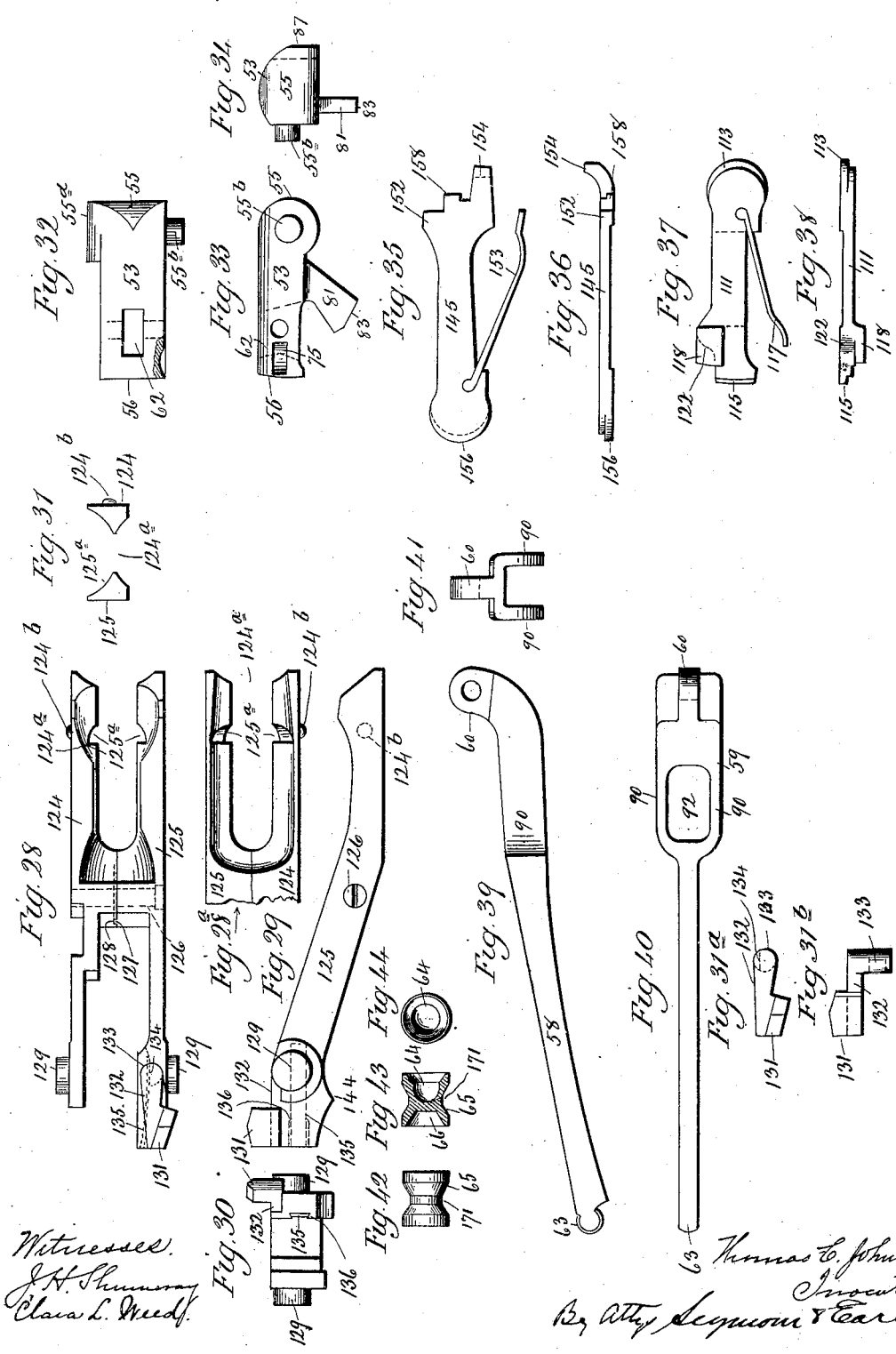

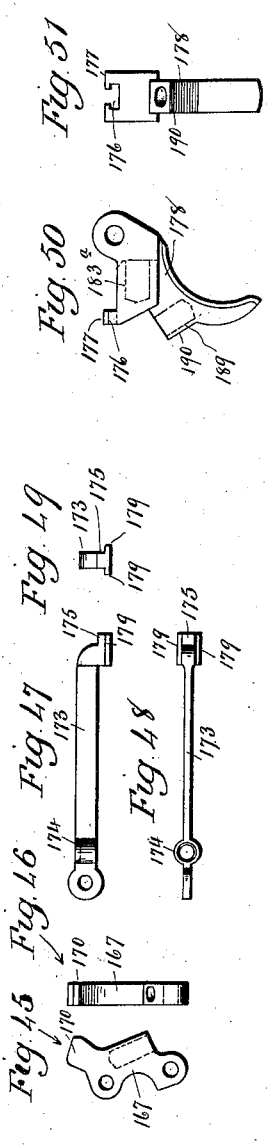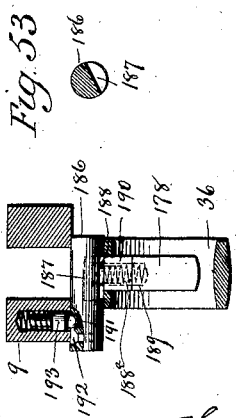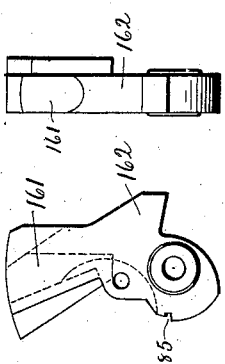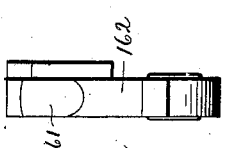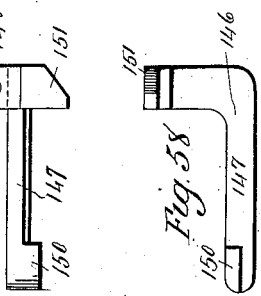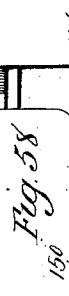

No. 768,665.　　　　　　　　　　　　　　　　　　　　　　　　Patented August 30, 1904.

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

RECOIL-OPERATED FIREARM.

SPECIFICATION forming part of Letters Patent No. 768,665, dated August 30, 1904.

Application filed June 29, 1903. Serial No. 163,630. (No model.)

*To all whom it may concern:*

Be it known that I, THOMAS C. JOHNSON, of New Haven, in the county of New Haven and State of Connecticut, have invented a new and useful Improvement in Recoil-Operated Firearms; and I do hereby declare the following, when taken in connection with the accompanying drawings and the figures of reference marked thereon, to be a full, clear, and exact description of the same, and which said drawings constitute part of this specification, and represent, in—

Figure 1, a view in side elevation of one form which a gun constructed in accordance with my invention may assume, the gun being complete and shown from the right-hand side; Fig. 2, a detached broken view, on a larger scale than Fig. 1, in right-hand side elevation, of the fore part of the gun viewed as a take-down gun; Fig. 3, a corresponding view, on the same scale as Fig. 2, showing the rear part of the gun viewed as a take-down gun; Fig. 4, a broken view, drawn to full size, partly in side elevation and partly in vertical longitudinal section, showing the barrel, the barrel-closing spring, the fore-stock, the tubular magazine, the magazine-spring, the buffers, and the integral tip located at the front end of the magazine; Fig. 5, a broken view, in side elevation, of the front end of the magazine to show the integral tip thereof; Fig. 6, a front end view of the tubular magazine with the plug removed; Fig. 7, a detached sectional view of the magazine-plug; Fig. 8, a broken view of the gun in vertical longitudinal section, showing the several parts of its breech mechanism or system in the positions they will have just at the instant of firing, the hammer having fallen, but the recoil not having taken place; Fig. 9, a detached perspective view looking into the interior of the barrel extension from the open right-hand side thereof; Fig. 10, a detached view, in rear elevation, of the barrel extension; Fig. 11, a detached broken view showing the right-hand wall of the gun-frame in horizontal section and showing the cartridge cut-off in plan and engaged with a cartridge; Fig. 12, a broken view of the gun in vertical longitudinal section complementary to Fig. 8 and showing the several parts of its breech mechanism or system in the positions they will have just after the gun has been fired and when they are at the limit of their recoiled positions; Fig. 13, a detached view, in right-hand side elevation, of the breech-block, with particular reference to showing the locking of its locking-block in its unlocked position by the locking-block catch; Fig. 14, a detached view, partly in plan and partly in horizontal section, of the breech-block, with particular reference to showing the locking of the locking-block in its unlocked position, as well as to showing the ejector of the gun; Fig. 15, a reverse plan view of the breech-block, with particular reference to showing the cartridge-stop and the clearance-cut in the block for the reception of the carrier-elevator; Fig. 16, a view of the breech-block corresponding to Fig. 13, but taken from the left-hand side thereof, with particular reference to showing the ejector; Fig. 16$^a$, a detached broken plan view of the breech-block to show the locking-block seat which is open at one end; Fig. 17, a detached view of the breech-block in rear elevation with all of the parts carried by it removed except the locking-block catch; Fig. 18, a detached view of the breech-block, partly in front elevation, to show the ejector and extractor and partly in vertical section to show the spring plunger-pin which secures the cartridge-stop to the block; Fig. 19, a detached plan view of the locking-block catch; Fig. 20, a view thereof in side elevation; Fig. 21, a view of the locking-block catch in transverse section on the line *c d* of Fig. 19. Fig. 22 comprises detached end and side views of the ejector which also forms the left-hand extractor; Fig. 23, a view in vertical longitudinal section of the gun-frame stripped of all of its parts and showing the inner face of its left-hand wall; Fig. 24, a view thereof in transverse section on the line *e f* of Fig. 23; Fig. 25, a broken detached view, in side elevation, of the guard-frame of the gun looking at the right-hand side thereof; Fig.

26, a broken view showing the guard-frame in plan and a portion of the gun-frame in horizontal section, the said guard-frame being shown just after it has been entered into the gun-frame in putting the gun together as a take-down gun; Fig. 27, a reverse broken view of the gun-frame with particular reference to showing its guard-frame-locking grooves and the ledges which are continuations of the upper walls of the said grooves; Fig. 28, a detached plan view of the carrier, showing also the carrier-cam carried by it; Fig. 28$^a$, a detached broken reverse plan view showing the transverse cartridge-stop shoulders in the under face of the forward end of the carrier; Fig. 29, a view of the carrier in right-hand side elevation; Fig. 30, a detached view of the carrier in rear elevation; Fig. 31, a view of the carrier in front elevation; Fig. 31$^a$, a detached plan view of the pivotal carrier-elevator; Fig. 31$^b$, a side view thereof; Fig. 32, a detached plan view of the locking-block which serves to lock the breech-block as well as to retract the firing-pin; Fig. 33, a view thereof in right-hand side elevation; Fig. 34, a view thereof in front elevation; Fig. 35, a detached view, in side elevation, of the cartridge cut-off; Fig. 36, a plan view thereof; Fig. 37, a view in side elevation of the breech-block detent; Fig. 38, a plan view thereof; Fig. 39, a detached view, in side elevation, of the breech-block-operating rod; Fig. 40, a corresponding plan view thereof; Fig. 41, a corresponding view thereof in front elevation; Fig. 42, a detached view, in side elevation, of the timing-follower; Fig. 43, a sectional view thereof; Fig. 44, a view thereof in front elevation; Fig. 45, a detached view, in side elevation, of the automatic timing-lever; Fig. 46, a view thereof in front elevation; Fig. 47, a detached view, in side elevation, of the timing-rod; Fig. 48, a plan view thereof; Fig. 49, a view thereof in front elevation, showing its nose which fills the gap made between the trigger and the sear; Fig. 50, a view in side elevation of the trigger, showing its adaptation to coöperate with the nose of the timing-lever; Fig. 51, a view thereof in rear elevation; Fig. 52, a broken view, in vertical section, on the line $h\ i$ of Fig. 3, through the lower tang of the gun and the trigger and showing the parts of the manual-safety in its unlocked or retired position; Fig. 53, a sectional view of the manual-safety; Fig. 54, a detached view, in side elevation, of the hammer; Fig. 55, a corresponding front view thereof; Fig. 56, a corresponding plan view thereof; Fig. 57, a detached view, in right-hand side elevation, of the cartridge-controller; Fig. 58, a reverse plan view thereof; Fig. 59, a view thereof in front elevation.

My invention relates to an improvement in automatic magazine-firearms in which the recoil following the explosion of a cartridge in the chamber is utilized to operate the breech mechanism, the object being to produce an effective, reliable, convenient, and safe arm constructed with particular reference to lightness and simplicity of construction and to reducing the number of pins and screws in the system to the minimum.

With these ends in view my invention consists in a gun having certain details of construction and combinations of parts, as will be hereinafter described, and particularly pointed out in the claims.

As herein shown, the several features of my invention are represented as embodied in a shotgun; but they may be used in the construction of other kinds of firearms as far as applicable and are not limited to use in shotguns.

In the gun shown the recoiling gun-barrel 2 is formed at its rear end with an externally-threaded shank 3, adapting it to be screwed into the internally-threaded forward end of the barrel extension 4, Figs. 9 and 10, which, if preferred, may be made integral with the barrel. The said barrel extension is substantially cylindrical in cross-section at its forward end, but has the right-hand and bottom portions of its rear end broken away to form a wide opening 5, through which the loaded cartridges are fed up from below and from which the spent shells are ejected to the right. The said barrel extension 4 fits within a virtually-circular horizontal chamber 6, occupying the upper portion of the gun-frame 7, often spoken of as the "receiver." The said gun-frame 7 has an imperforate top and imperforate side walls, with the exception that its right-hand-side wall is formed with an ejection-opening 8. The bottom of the gun-frame is open, having a long opening 7$^a$, Fig. 27, the forward end of which serves as a loading-opening and the rear end of which receives the guard-frame 9. As will appear later on, it is unnecessary under my improved construction to form any pivot-holes or any screw-holes in the top or sides of the gun-frame, which is obviously a matter of great advantage. The said gun-frame 7 is connected on the take-down principle, as will be described later on, with a guard-frame 9, to which the butt-stock is attached. The gun is provided with a tubular magazine 11, the rear end of which is externally threaded to adapt it to be screwed into an internally-threaded socket 12, formed for its reception in the lower portion of the forward end of the said gun-frame 7. The said magazine 11 is inclosed by a fore-stock 13, the rear end of which is formed with a tenon 14, entering a circular groove 15, formed in the forward edge of the gun-frame and concentric with the socket 12, before mentioned.

Having thus identified the main external features of the gun, I will now take up and describe the various features of my improvement in what seems to me to be a convenient order for the explanation.

At its front end the fore-stock 13 has a short annular tenon 16, adapted to be entered into an annular tenon-recess 17 in the rear face of an annular integral take-down flange 18, formed with a series of radial holes 19 to receive the pins of a spanner-wrench, by means of which the magazine is screwed into or unscrewed from the gun-frame. Under this construction the fore-stock is entirely supported against endwise and sidewise movement by the gun-frame and the part 18, the main body of the magazine not being relied upon to support the fore-stock against sidewise movement. The said take-down flange has its front end rounded and is internally threaded to receive an externally-threaded magazine-plug 20, normally located in the said take-down flange and provided for the introduction and removal of the magazine-spring 21 and the magazine-follower 22, which follower is applied to the rear end of the said spring.

The recoiling gun-barrel 2 is guided and supported in moving back and forth by a guide or support in the form, as shown, of a large guide-ring 29, made integral with or fastened to its lower face and adapted in internal diameter to receive the magazine 11, the rear end of which, as already explained, is rigidly connected with the forward end of the gun-frame. Two buffer-rings 30 and 31, formed of compressed fiber or other equivalent material, are interposed between the forward face of the said guide-ring 29 and a circumferential shoulder 32, formed on the forward end of the magazine, near the front end thereof. These buffer-rings take the shock of the barrel when the same reaches the limit of its forward excursion under the influence of the barrel-closing spring 33, which encircles the magazine and is interposed between the rear face of the guide-ring 29 and the lower portion of the forward face of the gun-frame 7.

In order to permit the tubular magazine 11 to be passed from front to rear through the fore-stock and through the guide-ring 29 for having its threaded end screwed into the internally-threaded socket 12 in the gun-frame 7, the fore-stock 13 must be internally cut away or chambered sufficiently to clear the buffers 30 and 31 and the stop-shoulder 32 formed integral with the forward end of the magazine, as just described. This large clearance-chamber 13$^a$ in the fore-stock is equally necessary to provide for clearing the buffers 30 and 31 and the stop-shoulder 32 when the magazine is unscrewed from the gun-frame, so as to permit it to be drawn forward out of the fore-stock. The fore-stock being chambered, as described, for the purposes of clearance receives no support as to sidewise movement from the magazine. This being clear, the necessity of providing the front end of the fore-stock with a tenon 16 and the takedown flange 18 with the recess 17 to receive the tenon 16 will be apparent, as well as the necessity of providing the rear end of the fore-stock with the tenon 14 and the gun-frame with a groove 15 for receiving the same, whereby the fore-stock is centered and supported at its rear and forward ends independently of the body of the magazine. By chambering the fore-stock, as described, and not relying upon the body of the magazine to support the fore-stock against sidewise movement it will also be clear that the magazine may be screwed into and unscrewed from the gun-frame without the development of any friction between it and the body of the magazine, which must be hugged by the fore-stock in case the same is to be supported as to sidewise movement by the body of the magazine. It will also be noted that the said take-down flange 18, although it acts to center and support the front end of the fore-stock, does not act as an abutment for the front end of the fore-stock in stopping the recoiling barrel at the limit of its forward movement, the stop-shoulder 32, formed on the magazine itself, being provided for that purpose.

With reference now to the take-down feature of my improved gun the guard-frame 9, before mentioned, comprises a very heavy upper tang 34, a lower tang 35, a guard 36, and a forwardly-projecting take-down lug 37, constituting, as it were, an extension of the forward end of the upper tang 34. In the lug 37 I mount a take-down screw 38, having its rear end furnished with a thumb-screw head 39, formed with locking-grooves which receive the forward end of a locking-spring 40, located in a recess 41, formed in the upper face of the upper tang 34, and held in place by a pin 42. The forward end of the said recess 41 is made deep enough to permit the forward end of the spring 40 to be depressed by the finger, so as to clear the head 39 and permit the same, and hence the screw 38, to be freely rotated in either direction. A pin 43, mounted in the unthreaded middle portion of the screw 38, prevents the same from being pulled away from the lug 37. The threaded forward end of the screw is adapted to be entered into an internally-threaded bushing 44, also having external threads adapting it to be inserted into a threaded hole formed for its reception in the heavy rear wall of the gun-frame 7, Figs. 8 and 12. The lower edge of the lug 37 is formed with a retaining-shoulder 45, coacting with the upper edge of a lug 46, projecting rearwardly from the rear wall of the gun-frame 7. The take-down construction thus far described corresponds substantially to that shown and described in my prior patent, No. 681,481, granted on the 27th day of August, 1901.

With particular reference to my present invention so far as it concerns the take-down feature of the gun, the forwardly-projecting main or body portion of the said guard-frame is formed at its forward end with two oppositely-located longitudinally-arranged locking-ribs 47, adapted to enter by a straight sliding movement into two corresponding longitudinally-arranged locking-grooves 48, Fig. 23, formed in the inner face of the side walls of the gun-frame 7 at a point midway the length thereof. The upper walls of these grooves form, as it were, continuations of long locking-ledges 49, extending rearwardly to the rear end of the gun-frame and produced by cutting away the lower portions of the inner faces of the side walls of the said frame to form the clearance-opening 50 required for the reception of the edges of the main body of the guard-frame. The upper face of the extreme forward end of the main body of the guard-frame is formed with a clearance-bevel 51, Fig. 25, and permits the guard-frame to be swung downward away from the gun-frame just as soon as the two frames have been drawn longitudinally apart sufficiently to entirely clear the locking-ribs 47 of the guard-frame from the locking-grooves 48 of the gun-frame. Before this transpires the said shoulder 45 will have been disengaged from the lug 46. It is to be noted in this connection that not only are the locking-ribs 47 engaged with the upper walls of the locking-grooves 48 throughout the length thereof, but also that when the gun is not broken down the upper edges of the main body of the tang are engaged throughout a considerable portion of the length thereof with the long locking-ledges 49 of the gun-frame, whereby the two frames are very solidly united. When the two frames are coupled together, their bearing one on the other is practically continuous, while, on the other hand, as soon as they are pulled apart for a short distance this practically-continuous bearing may be almost entirely broken at once by swinging the guard-frame downward with respect to the gun-frame, as already described, and whereby the dismounting of the gun is made convenient and speedy. It should also be observed that the long locking-ledges of the gun-frame coact with the upper edges of the body portion of the guard-frame in guiding the two parts and riding them one upon the other when the gun is put together. I also wish to point out that the union between the two frames is made very stiff, because the guard-frame is coupled at its forward end with the gun-frame midway the length of the latter instead of at or near the forward end of the latter.

With reference now to the breech mechanism or "system," as it is sometimes called, of my improved gun the breech-block 52 thereof is mounted in the barrel extension 4, in which it reciprocates back and forth when the gun is fired, the barrel, barrel extension, and breech-block recoiling together until the barrel extension and breech-block impinge against the inner face of the rear wall of the gun-frame. For the purpose of locking the breech-block to the barrel extension during this recoiling movement I employ a pivotal locking-block 53, located in a wide vertical slot 54 in the breech-block and having at its forward end a large knuckle-like integral bearing 55, which seats in a broken circular seat $55^a$, formed in the forward end of the breech-block (Fig. $16^a$) and opening at its left-hand end through the left-hand wall of the block, so as to permit the said bearing to be slipped into and out of the said seat in applying the locking-block to the breech-block and removing it therefrom. The right-hand end of the bearing 55 is extended by a heavy integral trunnion $55^b$, entering a trunnion-hole $55^c$, leading out of the closed right-hand end of the said seat, while the left-hand end of the said bearing is extended beyond the left-hand face of the locking-block to form a larger trunnion $55^d$, which fills the open left-hand end of the seat, which is at this place nearly circular. Under this construction I dispense with the use of any independently-formed pivot for the locking-block and secure for it a larger recoil-surface than I can secure by using any pin. The rear end of the block 53 has a curved locking-face 56 and is lifted into its locking position, in which it is entered into a locking-notch 57, formed in the barrel extension 4, and drawn down into its unlocking position, in which it is depressed below the upper face of the breech-block by means of a part which has several different functions and which I shall for convenience call a "breech-block-operating rod" 58. This rod is formed at its forward end with a yoke-like head 59, having an upwardly-extending lug 60, perforated for the reception of a pivot-pin 61, passing transversely through the rear end of the locking-block 53, which has a vertical slot 62 for the reception of the said lug. At its rear end the rod is formed with the ball member 63 of a ball-and-socket joint, the socket member of which is formed by a socket 64 in the forward end of a timing-follower 65, the rear end of which has a socket 66 for the reception of the forward end of the coiled breech-block-closing spring 67, which is located in part in a chamber or bore 68, formed to receive it in the upper tang 34 of the gun-frame, and also located in part in a corresponding chamber or bore $68^a$, formed in the butt-stock 10. When the gun is opened, either manually in order to load it or automatically by the recoil of firing it, the said spring 67 is compressed, and therefore put under the tension required for closing the breech-block 52 and lifting the locking-block 53 thereof into its locking position. I may here explain (and this is important) that the said locking-block 53 is positively drawn down from its unlocking position during the recoil of the barrel, barrel extension, and breech-block as the result of the engagement of the upper edge of the said breech-block-operating rod 58 with the beveled upper wall or cam-surface 69, forming the top of an opening 70, made in the rear end wall of the gun-frame 7 for the reception and longitudinal movement through it of the said rod. This positive unlocking of the locking-block begins when the block has made about two-thirds of its rearward excursion, but is not completed until the barrel extension and block impinge against the rear end wall of the gun-frame. I particularly wish to emphasize the fact that the unlocking of the locking-block is in my present invention positive. In order to guarantee clearance, the locking-block is drawn down a little below the upper face of the breech-block, and therefore more than is strictly necessary to clear it from the locking-notch 57 in the barrel extension. The said rod also performs an important function in breaking the recoil and slowing down the movement of the recoiling parts, which it does by the friction produced by the riding of its upper edge or surface under the beveled upper wall or cam-surface 69, forming the top of the opening 70 in the rear wall of the gun-frame. The amount of friction developed by the said rod will always be equal to the occasion, because the greater the pressure developed by the firing of the gun the harder it is to pull the locking-block down into its unlocking position, and the harder it is to pull the said block the greater the friction developed by the rod which thus in itself takes the place of any other brake for slowing down the recoiling movement of the barrel, barrel extension, and breech-block. This friction-brake not only balances itself, as it were, to the amount of friction required in the case of using different charges, but does not begin to act until the recoiling parts have made about half their rearward movement. Then when slowing down becomes necessary the brake begins to act. Obviously this is a much better arrangement than a constantly-acting brake. To prevent the locking-block from being lifted out of time by the forward thrust of the spring 67 acting through the rod 58, I employ a locking-block catch 71, located in a horizontal recess 72 in the rear end of the right-hand wall of the said breech-block 52. The said catch swings in a horizontal plane upon a pin 73 and at its forward end has an inwardly-projecting beveled nose 74 to enter a locking-notch 75 in the rear end of the right-hand wall of the locking-block. A small spring 76, engaging with the outer edge of the catch 71 at a point forward of the pin 73, exerts a constant effort to enter the nose 74 into the notch 75. At its rear end the catch has an unlocking-lug 77, having a cam-surface 78, which coacts with the outer wall of a slot 79, formed in the extreme rear end of the barrel extension 4, the said lug 77 entering the said slot 79 just as the breech-block is approaching the limit of its forward excursion. Then when the said breech-block does reach the limit of its said excursion the lug 77 and slot 79 coact to swing the catch 70 and disengage the same from the locking-block, which is immediately lifted into its locking position by the thrust of the spring 67, acting through the rod 58, for, it will be observed by reference to Fig. 12 of the drawings, that the pivot-pin 61, connecting the forward end of the rod with the locking-block, is located above the bearing 55, on which the block itself turns.

For the retraction of the firing-pin 80, which is mounted in a slightly-inclined position in the breeching-block 52, the locking-block 53 is formed with a downwardly and rearwardly extending fin-like retracting-arm 81, which enters a cut 82, formed for it in the right-hand side of the firing-pin. A cam-surface 83 upon the rear edge of the arm 81 coacts with a nose 84, forming the rear wall of the cut 82, and positively retracts the firing-pin as the block is turned downward into its unlocked position. As long as the locking-block remains in its unlocking position its arm 81 will positively hold the firing-pin in its retracted position, nor is the firing-pin freed from the said arm for being pushed forward until the gun is not only closed, but also locked by the lifting of the locking-block, which releases the firing-pin. Near its forward end the firing-pin is formed with a stop-notch 85, receiving the knuckle-like bearing 55 at the forward end of the locking-block. The said notch 85 is sufficiently long to allow the firing-pin to have the necessary movement, which, however, is limited as to rearward movement by the engagement of the curved forward end wall of the said notch with the forward face of the said bearing and, as to forward movement, by its own engagement with the forward end wall of the chamber 88, in which it is located. In this way I limit the movement of the firing-pin without employing the independently-formed stop-pin generally used. In order to connect the forward end of the rod 58 with the locking-block 53 and at the same time extend the firing-pin through to the rear end of the breech-block 52, I form the forward end of the said rod with the yoke-like head 59, Figs. 40, 41, which fits down over that integral part of the block which forms the housing 89 for the rear end of the firing-pin, as shown in Fig. 17. The side members 90, Fig. 40, of the said head 59 are free to move up and down in the spaces 91 91, located on the opposite sides of the housing 89, while elongated opening 92, formed in the top of the head, adapts the same to be "shut down," so to speak, over the rear end of the housing 89 and over the projecting rear end of the firing-pin.

At its forward end the breech-block is provided on its right-hand side with a pivotal spring-actuated extractor 93, which may be of any ordinary construction, and on its left-hand side with a spring-controlled ejector, which, as herein shown, combines also the function of an extractor to supplement the action of the extractor 93. The said ejector consists of a head 94, the forward end of which forms an ejecting-face 95, which is normally flush with the flat front end or face of the breech-block. As shown, the said head has upon its outer face a hook 96, forming an extracting-hook, the barb of which is less aggressive than that of the hook 93. The rear end of the said hook 96 is rounded and forms what I shall for convenience call the "ejecting-shoulder" 97, for the reason that it is the impingement against this shoulder of the correspondingly-rounded rear-end wall 98 of a long ejector-slot 99, Figs. 9, 10, formed in the inner face of the left-hand wall of the barrel extension, that operates the ejector, as will be more fully described later on. The said ejector is also formed with an elbow-like offset 100, extending downwardly from its head 94, and with a rearwardly-extending arm 101, having at its rear end an inwardly-projecting lug 102, the forward face of which is recessed, Fig. 14, for the rear end of a spiral ejector-retracting spring 103, located in a deep chamber 104, formed for its reception in the left-hand side wall of the breech-block and leading out of the bottom of a larger but shallower recess 105, formed therein for the reception of the ejector. The forward end of the said spring engages with the forward end wall of the chamber 104. For its retention in the breech-block without the use of pins the ejector is formed upon its head 94 with two long longitudinal retaining-ribs 106, taking into grooves 107 107, Fig. 18, leading out of the recess 105, while the rear end of the ejector is held in place and guided by a retaining-rib 108, formed upon the lower edge of the arm 101 and taking into a groove 109, leading out of the lower wall of the said recess 105, as shown in Fig. 16. These ribs 106 and 108 avoid the necessity of any screws or pins for retaining the ejector in place. The rear end of the head 94 of the ejector is shaped to form a stop-shoulder 110 for engagement with a wall of the recess 105 to limit the rearward movement of the ejector under the tension of the spring 103, so that the ejecting-face 95 of the ejector will always be flush with the front face of the block except momentarily at the time of ejection. When the breech-block moves forward and pushes a loaded cartridge ahead of it into the firing-chamber of the gun-barrel, the hook-extractor 93 and the extracting-hook 96 of the ejector grip the rim of the cartridge, the latter with less aggressiveness than the former. Then when the gun is fired the barrel, barrel extension, and breech-block recoil together and compress the barrel-closing spring 33 and the breech-block-closing spring 67. When they together reach the limit of their rearward excursion, the block is caught and detained, as will be presently described; but the barrel extension having meanwhile been unlocked from the breech-block by the positive downward movement of the locking-block, as already set forth, the barrel and barrel extension are pulled forward by the barrel-closing spring, which, so to speak, "strip" the barrel over and off from the spent shell, which is at this time held by the hooks carried by the now-detained breech-block. However, just before the barrel reaches the limit of its forward excursion the wall 98 of the slot 99 in the barrel extension impinges against the shoulder 97 of the ejector and, so to speak, "thrusts" the same forward against the tension of its spring 103, whereby its ejecting-surface 95 is projected ahead of the front face of the breech-block and against the left-hand portion of the head of the spent shell, which is disengaged from the extractor 93, swerved by swift movement from left to right, and ejected through the ejection-opening 8 in the gun-frame, turning upon the extractor 93 as a point of purchase. The ejection of the spent shell is followed almost immediately by the release of the breech-block, which is then moved forward, and it has no sooner begun its forward movement than the ejector-spring 103 begins to act to retract the ejector into its normal position.

For the purpose of temporarily detaining the breech-block 52 at the limit of its rearward excursion I employ a breech-block detent 111, Figs. 37, 38, located in a shallow recess 112, Fig. 23, in the inner face of the left-hand wall of the gun-frame 7. This detent is retained in place without the use of pins or screws by providing its forward end with a crescent-shaped retaining and bearing rib 113, working in a corresponding undercut groove 114, leading out of the forward end of the recess 112. The detent turns upon this rib as upon a pivot, none other being required. The rear end of the detent has a very slightly curved retaining-rib 115, working in an undercut groove 116, leading out of the bottom of the rear end of the said recess 122, as shown in Fig. 23. An operating-spring 117, secured to the detent and at its free end entering an undercut 117$^a$ in the lower wall of the recess 112, exerts a constant effort to lift the part up into its block-detaining position. At its rear end and near its upper edge the detent is provided with a detaining-lug 118, the rear end of which enters, when the detent is lifted, a notch 119, Fig. 18, in the lower left-hand corner of the front face of the breech-block. This takes place when the breech-block is at the limit of its rearward excursion, where it is held while the barrel and barrel extension are being returned to their normal positions by the barrel-closing spring 33. However, just before they reach their normal positions the beveled rear wall 120 of a long clearance-groove 121, formed in the extreme lower edge of the left-hand wall of the barrel extension, engages with a cam-surface 122, located on the detent at a point close to the detaining-lug 118, and depresses the detent 111 against the tension of its spring 117, whereby the said lug 118 is entirely cleared from the notch 119 and the breech-block left free to be pushed forward into its closed position by the tension of the spring 67.

I have shown my improved gun as provided with a two-part pivotal cartridge-carrier composed of two substantially corresponding longitudinal parts 124 and 125, united by a screw-stud 126, passing transversely through them. They are locked together and prevented from rotating with respect to each other by a tongue 127, formed on one part, and entering a groove 128, formed on the other part. Their forward ends are cut away to form a finger-opening $124^a$, while their lower faces are formed with a stop-shoulder $125^a$. At their rear ends the parts 124 and 125 are provided with trunnions 129 entering suitable trunnion-holes 130, Fig. 23, in the gun-frame 7. I thus avoid the use of an independently-formed carrier-pivot. This two-part carrier structure is not, broadly considered, of my invention, and will be claimed in another application, filed July 2, 1903, by William Mason and Frank F. Burton, serially numbered 164,052. My invention, so far as the carrier is concerned, consists in providing it with a swinging-carrier elevator-cam, comprising a cam proper, 131, having its inner face beveled and its top doubly beveled. The said cam 131 is located at the rear end of an arm 132, formed at its forward end with a downwardly-extending shank 133, upon which the said arm turns as upon a pivot. The said shank extends downwardly into the rear end of the part 125 of the carrier and has a flattened face 134, having sharp edges and engaged by the rear end of a spring 135 in a groove 136 in the inner face of the rear end of the said part. In the rearward excursion of the breech-block the beveled inner face of the cam 131 is engaged by a cam-surface 137, forming the lower right-hand corner of the breech-block, which as it moves rearwardly pushes the said cam outwardly against the tension of the spring 135, Fig. 28. Thus shunted the cam rides on the rear portion of the lower right-hand edge of the breech-block until the same reaches the limit of its rearward excursion, when the spring 135 acts to move the said cam inward into a notch 138, formed in the said side wall of the breech-block. The rear wall of this notch is shaped to form a lifting-cam 139, which when the breech-block begins its forward movement engages directly with the top of the cam 131 and acting through the same depresses the rear end of the carrier and correspondingly swings the forward end upward from its cartridge-receiving position in line with the tubular magazine 11 into the cartridge-delivering position in line with the gun-barrel 2. The forward end of the carrier having been lifted, as described, by the cam 131, coacting with the lifting-cam 139, is maintained in its lifting position by the riding of the straight lower right-hand edge of the breech-block over the said cam 131. In the timing of the arm the carrier will thus be maintained in its elevated position until after the cartridge in front of the breech-block has been well entered into the firing-chamber of the gun-barrel. Then the rear end of the breech-block will ride over and off the cam 131, and the carrier will be immediately depressed by the coiled carrier-spring 140, located in the bottom of a rearwardly-inclined spring-socket 141 in the right-hand edge of the main or body portion of the guard-frame. The said socket also receives a plunger 142, held in place by a pin 143 and engaging with a nose 144, formed on the part 125 of the carrier at a point just to the rear of the trunnion 129 thereof, whereby the spring exerts a constant effort through the said plunger to depress the forward end of the carrier.

In order to prevent the cartridge-carrier from swinging down at its forward end out of the loading-opening in the gun-frame when the gun is taken down, I provide it at its forward end with a laterally-projecting stop-boss or projection $124^b$, which normally plays up and down in a very shallow carrier-stop groove $124^c$, formed in the inner face of the left-hand wall of the gun-frame well toward the forward end thereof. The said stop-boss engages with the narrow shoulder formed in the bottom wall of the said groove and prevents the carrier from dropping down out of place when the gun is taken down, at which time the carrier is deprived of the support of the tang. To swing the carrier down, it is only necessary to take a knife or some corresponding instrument and insert it into the gun, so as to spring the carrier sufficiently to permit the said boss to pass the said shoulder.

For preventing the cartridges from being pushed by the magazine-spring too far rearward onto the carrier, as well as for operating the cartridge cut-off 145, (to be described later on,) I employ a part which for want of a better name I shall call a "cartridge-controller." It consists of an elbow 146, located in a shallow recess 147 in the lower face of the breech-block and held therein by an ear 148, formed at its forward end and perforated for the reception of a spring-actuated retaining pin or plunger 149, located in a recess $149^a$ in the breech-block. For better holding the part in the breech-block the upper edge of the ear 148 has a retaining-rib $148^a$ entering an undercut groove $148^b$, extending out of the said recess 147. By pushing the plunger 149 inwardly out of the ear 148 the cartridge-controller may be removed from the breech-block. It may be stated in this connection that in assembling the gun the breech-block is inserted into the barrel extension, after which both are introduced into the forward end of the gun-frame. The cartridge-controller is then applied to the breech-block through the open bottom of the gun-frame, whereby the cutting of the same is reduced to the minimum. The frame would have to be cut away considerably more at its forward end than to receive the barrel extension and breech-block if the cartridge-controller were not made to be secured in place in the breech-block after the introduction of the same into the gun-frame.

The cartridge-stop proper consists of a lug 150, formed at the rear end of the elbow 146 and having a square forward edge. This lug projects downward below the concave lower face of the breech-block and is located at a distance from the forward face thereof a little less than the length of a cartridge, so that when the block is in its closed position and the cartridge is fed rearward under it from the tubular magazine the cartridge will be arrested by the said lug with its forward end still extending into the magazine and holding in front of it the next succeeding cartridge. The cartridge-controller is formed at its forward end with a cartridge-cut-off-operating lug 151, located on the elbow 146 so as to depend from the forward end of the right-hand side of the breech-block. Now when the barrel extension and breech-block recoil together the lug 151 moves rearward and off from a nose 152, formed at the forward end of the cartridge cut-off 145, Fig. 35, which is lifted by its spring 153, so as to bring its inwardly-turned cut-off finger 154 into position to engage with the head of the next succeeding cartridge and prevent the same from emerging from the tubular magazine. It will be understood that by locating the lug 150 so as to stop the cartridge with a portion of its forward end still in the magazine time is secured for the release and operation of the cartridge cut-off 145 before the succeeding cartridge can cover the distance from the point at which it was held by the fed cartridge to the mouth of the magazine. In other words, the location of the lug 150 is arranged to secure an interval of time within which the cartridge cut-off may act while the block is recoiling.

The flat plate-like cartridge cut-off 145 corresponds generally to the breech-block detent 111 and is located in a shallow recess 155, Fig. 11, in the right-hand wall of the gun-frame. At its rear end it has a crescent-shaped retaining-rib 156, entering a corresponding undercut groove 157, leading out of the bottom of the recess 155. At its forward end it has a retaining-rib 158, entering an undercut groove leading out of the bottom of the forward end of the said recess 155 and corresponding to the groove 116 aforesaid, but not shown. Under this construction the cut-off swings upon its rear end as upon a pivot, none other being required. The spring 153 enters into an undercut leading out of the bottom of the recess 155 and corresponding to the undercut 117$^a$ aforesaid, but not shown. A lug 160, formed at the rear left-hand corner of the breech-block, assists in guiding and steadying it.

With reference now to the hammer and timing mechanism of the gun, my improved hammer 161 is provided near the lower end of its forward edge with a very heavy forwardly-projecting stop-arm 162, which when the gun is taken down and the hammer released comes to a broad firm bearing upon the center of the forward end of the upper face of the main body portion of the guard-frame 9. This hammer turns upon a hammer-pin 163 and is furnished with a pivotal hammer-spring guide-rod 164, encircled by a hammer-spring 165 and projecting at its rear end through a hole 164$^a$ in the hammer-spring abutment 166, forming a part of the guard-frame 9.

To prevent the gun from being by any possibility fired before the breech-block is fully closed and locked, I employ what I shall term an "automatic timing device," comprising a timing-rocker 167, hung on a pivot 168 from two corresponding flanges 169, depending from the forward end of the upper tang 34. The upper end of this rocker consists of a short finger 170, adapted to enter the spring-chamber 68 in the tang 34 through the forward end of a long slot 68$^b$, leading downward from the chamber 68 through the lower face of the tang. This finger enters when the gun is closed an annular groove 171, formed in the timing-follower 65, and permits the rocker-spring 172 to turn the rocker on its pivot 168, whereby its lower end is moved forward, with the effect of correspondingly moving the timing-rod 173, the rear end of which is pivoted to the lower end of the timing-rocker. The said rod has a recessed enlargement 174, Fig. 48, near its rear end for the reception of the lower end of the rocker-spring 172. At its forward end the rod 173 is downwardly offset and provided with a horizontally-arranged nose 175, which enters an undercut slot 176, extending forwardly through a shoulder 177, formed at the rear end of the trigger 178. The undercut portions of the slot 176 receive guide-ribs 179, projecting from the opposite sides of the nose 175, these ribs being narrower than the depth of the undercut portions of the slot 176 to give the required freedom of play between the parts. However, by means of the construction just described the trigger and the forward end of the rod 173 are loosely coupled together, so that the timing-rod is always under the control of the trigger. The nose 175 constitutes, as it were, a bridge to fill the gap which always exists between the trigger and the tail 180 of the sear 181, which turns on a pin 182, mounted in the upper end of the trigger. A sear-spring 183, located in a socket 183ª in the trigger, engages with a recessed finger 184, projecting downwardly from the sear, and exerts a constant effort to depress the tail 180 of the sear, as well as to lift the nose of the sear proper, 181, into the cocking-notch 185 of the hammer. In case the trigger is pulled before the breech-block is in its fully-closed position and before the locking-block has been fully lifted into its locking position the sear will not and cannot be operated for releasing the hammer, and the only effect of pulling the trigger will be to lift its shoulder 177 upward back of the rear end of the tail of the sear, which will itself be undisturbed, because the gap between the said shoulder and the tail of the sear is not filled up by the forward projection into it of the nose 175 of the timing-rod, which is not allowed to move forward to fill this gap until the finger 170 of the timing-rocker 167 has entered the deep annular groove 171 of the timing-follower 65, which will not have moved sufficiently far forward to permit the finger 170 to enter its groove 171 until the breech-block has been fully closed and the locking-block has been completely lifted into its locking position, for the reason that the forward movement of the timing-follower is strictly controlled by the breech-block-operating rod 58, which moves the breech-block into its closed position and which after it has moved the breech-block into its fully-closed position must move forward still more in order to lift the locking-block into its locking position. It will thus be seen that the timing mechanism described cannot operate to fill the gap between the trigger and the sear until the breech-block has been closed and locked. Of course as long as the breech-block is over the hammer in the forward movement of the block the gun could not be fired even if the trigger were pulled. Then before the rear end of the breech-block has passed over the hammer the lower edge of the rod 58, at a point about midway the length thereof, engages with the upper edge of the finger 170 of the timing-rocker, so as to positively hold the same in its retired or safety position during the remaining portion of the forward movement of the rod and until the timing-follower is brought into operative relations with the timing-rocker. In case the user of the arm should keep his finger on the trigger and keep pulling thereupon after the firing of the gun and the gun should be then closed and the breech-block locked the nose 175 of the timing-rod 173 would come forward; but instead of entering between the trigger and the tail of the sear it would abut squarely against the end of the tail of the sear, so that the gun would not and could not be fired until the rearward draft of the finger upon the trigger were removed and the trigger-spring given an opportunity of swinging the trigger downward and forward, bringing the nose of the timing-rod with it and into position to be entered between the tail of the sear and the trigger.

In order to lock the gun so that it cannot be fired, I employ a short rod-like safety 186, mounted for transverse movement in the upper rear corner of the guard 36 and formed with a clearance-notch 187, designed to receive the upper end of a hollow-plunger 188, receiving the upper end of the trigger-spring 188ª, the lower end of which is entered into a socket 189, formed in the trigger. The said plunger is constantly entered into the said notch, which is made wide enough to receive the step 190 of the trigger when the slot is alined therewith, which it will be when the safety is in its open or firing position. To lock the trigger, however, the safety is pushed from left to right, whereby its said clearance-slot 187 is carried out of alinement with the step 190, so that when the trigger is pulled a portion of the step will engage with a point on the full-round surface of the safety and prevent the trigger from being operated. This device is used particularly when the gun is being handled. To hold the safety in its open and closed positions, I form it with two locking-notches 191 and 192, which are entered by the rounded end of a small spring-actuated plunger 193, located in a socket formed in the left-hand side of the guard-frame, as shown in Fig. 52.

Although I have described with more or less detail the operation of the several features of my improvement in conjunction with the description of their construction and arrangement, it may be well for me to describe the operation of the gun as a whole.

To load the gun, the cartridges are introduced one by one by hand into the loading-opening in the bottom of the gun-frame and forced upward against the carrier, which yields and moves upward, and so exposes the rear end of the tubular magazine, into which the cartridges are then partially entered. The cartridges are successively entered only part way into the magazine until the last cartridge is reached, but kept in engagement with the under face of the carrier in order to maintain the same in its elevated or magazine-loading position. This is necessary, because if the cartridges were fully entered into the magazine the carrier would be returned by its spring into its depressed position, after which the magazine-spring would at once operate to force the rear cartridge onto the top of the carrier, and thus block the further loading of the magazine until that cartridge has been pushed back into the magazine through the finger-opening of the carrier. To facilitate the loading of the magazine, the lower face of the carrier is formed with a stop-shoulder with which the heads of the cartridges are engaged in feeding them into the magazine and against which they are held by the tension of the magazine-spring and whereby they are prevented from being pushed rearward and altogether out of the magazine by the said magazine-spring. Furthermore, this shoulder stops each cartridge in the same position and facilitates the loading of the magazine by making the operation uniform as to each cartridge. When the last cartridge is fed into the magazine, its head is pushed forward beyond the forward end of the carrier and the same allowed under the action of its spring to return to its depressed position, at which time the magazine-spring will push out the same cartridge over the upper face of the carrier until it is engaged with the cartridge-stop depending from the breech-block, which at this time is in its closed position, the forward end of the cartridge being still left within the magazine in order to secure the time required, as already explained, for the operation of the cartridge cut-off. In order to load the cartridge on the carrier into the chamber of the gun-barrel, the user of the arm now grasps the gun-barrel itself with his left hand and draws it back, and with it the barrel extension and breech-block, and compresses the barrel-closing spring and the bolt-closing spring. As soon as the block starts the magazine-spring begins to push the cartridges in the magazine rearward, whereby the cartridge, partly on the carrier and partly in the magazine, is expelled entirely from the same and the next succeeding cartridge moved rearward until its head reaches the mouth of the magazine; but before it has a chance to emerge therefrom the cut-off finger of the cartridge cut-off has risen into its path and stopped its further movement, the cut-off having been released for this purpose by the riding back off its nose of the cartridge-cut-off-operating lug forming a part of the cartridge-controller mounted in the breech-block, and therefore starting back with the same. The cartridge on the carrier is now entirely freed from the magazine and ready to be lifted into line with the rear end of the gun-barrel when the carrier is elevated. Before this, however, and at the very beginning of the opening of the gun the starting back of the breech-block-operating rod also starts back the timing-follower, which rocks the timing-rocker, which retracts the timing-rod, and hence establishes that gap between the trigger and sear which precludes the snapping of the hammer even if the trigger should be pulled. As the block moves farther rearward the yielding carrier-elevator lug is pushed sidewise out of the way by the beveled rear right-hand corner of the block and thereafter rides on the right-hand side of the block until it is entered by its spring into the cartridge-elevator notch formed in the side of the block. In its rearward movement the breech-block rides over, forces down, and cocks the hammer. As the block moves back it is gradually unlocked from the barrel extension by the positive drawing down of the locking-block from engagement therewith, due to the camming down, as it were, of the breech-block-operating rod by the guard-frame as the rod moves back with the block. As the locking-block is drawn down in being unlocked it retracts the firing-pin and holds the same in its retracted position. When the breech-block has in this way been drawn back to the limit of its rearward movement, it is immediately engaged and temporarily held there by the breech-block detent. At this time also the unlocking movement of the locking-block is completed and the connection between the block and barrel extension broken. The user of the arm now lets up on his rearward draft upon the gun-barrel and allows the barrel and barrel extension to go forward under the power of the barrel-closing spring, leaving the breech-block behind. At the beginning of this forward movement of the barrel extension it frees the locking-block catch, which acts to lock the locking-block in its unlocked position. Just before the extension reaches the limit of its forward movement it engages with the breech-block detent and releases the breech-block, which at once starts forward under the power of the breech-block-closing spring. As the block starts forward the lifting-cam 139, formed by the rear wall of the notch formed in the said block to receive the swinging carrier-elevator cam 131, engages with the upper face thereof and cams the same down, whereby the rear end of the carrier is depressed and its forward end lifted into its elevated or cartridge-delivering position and whereby the head of the cartridge is lifted up into position to be engaged by the front face of the block, by which it is pushed into the chamber of the gun-barrel. The carrier is maintained in its said elevated position by the riding over it of the right-hand portion of the under face of the block until the same is nearly at the limit of its forward movement, when its rear end rides off the said cam 131, when the carrier-spring acts to depress the carrier into its cartridge-receiving position. Just before the breech-block reaches the limit of its forward movement the locking-block catch engages with and is operated by the barrel extension to release the locking-block, which is at once lifted into the locking-notch of the barrel extension by the forward movement of the breech-block-operating rod under the power of the breech-block-closing spring. The lifting of the locking-block also releases the firing-pin, which up to this time it has held retracted. At the close of the forward movement of the breech-block its cartridge-cut-off-operating lug rides up over the nose of the cartridge cut-off and depresses the same, so as to retire the cut-off finger thereof and permit the rearmost cartridge in the magazine to be fed out over the now depressed carrier until it engages with the cartridge-stop depending from the breech-block. Just at the end also of the forward movement of the breech-block the timing-follower, which has meanwhile been moving forward, brings its circumferential groove into alinement with the nose of the timing-rocker, which rocks and moves the timing-rod forward into position to fill the gap between the trigger and the sear, so that when the trigger is pulled it will operate through the nose of the timing-rod to lift the sear and release the hammer, which springs forward and strikes the firing-pin and explodes the cartridge. Now when the gun is fired the barrel, barrel extension, and breech-block recoil together and move rearward to the limit of their rearward excursion precisely as they were manually moved, as above described. At the very beginning of the recoil opening of the gun the timing-follower begins its rearward movement and immediately acts upon the timing-rocker to rock the same, whereby the timing-rod is retracted, so as to break and keep broken the connection between the trigger and sear necessary to the firing of the gun, the timing-rocker being held in its retracted position during the rearward movement of the breech-block-operating rod by the riding of the lower edge thereof over its nose. When under the force of recoil the breech-block reaches the limit of its rearward excursion, the detent operates to temporarily detain it in that position. The barrel and barrel extension now begin their forward or closing movement under the power of the barrel-closing spring, whereby the barrel is "stripped," so to speak, off the spent cartridge-shell, which has been carried rearward with the breech-block during the recoil thereof. Just before the barrel and barrel extension complete their forward movement the ejector mounted in the breech-block is engaged by the barrel extension and thrust forward beyond the face of the block, so as to give the spent shell a sharp rap, whereby the same is swerved from left to right and ejected through the ejecting-opening in the frame of the gun.

It is apparent that in carrying out my invention some changes from the construction herein shown and described may be made and also that I may embody one or more of the several features of my improvement as described herein in other forms of firearms so far as applicable. I therefore do not limit myself to the exact construction shown and described, but hold myself at liberty to make such departures therefrom as fairly fall within the spirit and scope of my invention.

Having fully described my invention, what I claim as new, and desire to secure by Letters Patent, is—

1. In a magazine-firearm, the combination with a breech-block, of a locking-block therefor, and a breech-block-operating rod pivotally connected to the said locking-block and during recoil having sliding engagement with a part of the gun which crowds it downward, whereby the said rod acts as a friction-brake for the recoiling parts and as a means for gradually drawing the locking-block down into its unlocked position.

2. In a magazine-firearm, the combination with a recoiling barrel, barrel extension and breech-block, of a locking-block mounted in the breech-block, a breech-block-closing spring, and a breech-block-operating rod pivotally connected to the locking-block, coacting with the breech-block-closing spring, and at the time of recoil having sliding engagement with a take-down flange of the gun, whereby the said rod acts as a friction-brake for the recoiling parts, and as a means for gradually unlocking the locking-block from the barrel extension.

3. The combination with a gun-frame having its rear wall formed with an opening, of a recoiling barrel and barrel extension, a breech-block, a locking-block mounted therein, a breech-block-operating rod pivotally connected to the locking-block, passing at its rear end through the said opening and during recoil having sliding engagement with the upper wall thereof, whereby the said rod acts as a friction-brake for the recoiling parts, and whereby it is forced downward by the said wall for gradually drawing the locking-block downward into its unlocked position.

4. In a magazine-firearm, the combination with a breech-block, of a locking-block therefor, and a rearwardly-extending breech-block-operating rod pivotally connected at its forward end with the said locking-block and acting as a friction-brake during recoil by having sliding or rubbing engagement with a part of the gun and also acting as a means for gradually unlocking the locking-block.

5. In a magazine-firearm, the combination with a recoiling barrel, barrel extension and breech-block, of a locking-block mounted in the breech-block for locking the same to the barrel extension, a breech-block-closing spring, and a breech-block-operating rod pivotally connected to the said locking-block and coacting at its rear end with the breech-block-closing spring which closes the breech-block and lifts the locking-block into engagement with the barrel extension, the said rod having during recoil sliding or rubbing engagement with a part of the gun, whereby the said rod acts as a friction-brake for the recoiling parts, and as a means for gradually unlocking the locking-block.

6. In a magazine-firearm, the combination with a recoiling barrel, barrel extension and breech-block, of a locking-block mounted in the breech-block for locking the same to the barrel extension, and a locking-block catch mounted in the breech-block for locking the locking-block in its unlocked position and operated by the said barrel extension for unlocking the locking-block.

7. In a magazine-firearm, the combination with a recoiling barrel, barrel extension and breech-block, of a locking-block mounted in the breech-block for locking the same to the barrel extension, a locking-block catch mounted in the rear end of the breech-block and operated for unlocking the locking-block by the rear end of the barrel extension.

8. In a firearm, the combination with a breech-block having a bearing-seat open at one end, of a locking-block having a locking-face and formed at its forward end with a knuckle-like bearing extended at one or both ends and adapted to be entered into the said seat through the open end thereof.

9. In a firearm, the combination with a breech-block having a bearing-seat opening at one end through the left-hand wall of the breech-block and having its opposite end closed and formed with a trunnion-hole; of a locking-block having a locking-face and at its forward end with a knuckle-like bearing fitting into the said seat and having one end furnished with a trunnion to enter the said trunnion-hole and having its opposite end extended to fill the open end of the said seat.

10. In a firearm, the combination with a breech-block, of a swinging cartridge-carrier, and a pivotal spring-controlled swinging carrier-elevator cam mounted in the rear end of the carrier and swung outwardly by the said block during the rearward movement thereof and depressed by the said block during the forward movement thereof for the elevation of the forward end of the carrier.

11. In a firearm, the combination with a breech-block, of a pivotal cartridge-carrier, and a swinging spring-controlled carrier-elevator cam mounted in the rear end of the carrier and engaged and pushed outward by the breech-block during the rearward movement thereof and which is engaged and depressed by the breech-block during the forward movement thereof for the elevation of the carrier, the said swinging cam comprising a cam proper, an arm and a shank upon which the part turns as upon a pivot.

12. In a magazine-firearm, the combination with a breech-block having a carrier-elevator notch in one of its side walls, of a swinging cartridge-carrier, and a pivotal spring-controlled carrier-elevator cam mounted in the carrier and having at its rear end a cam proper engaged and pushed outward by the said block during the rearward movement thereof and entered, when the block reaches the limit of its rearward movement, into the said notch the rear wall of which engages with the cam proper when the block begins its forward movement and thus elevates the forward end of the carrier.

13. In a firearm, the combination with a recoiling barrel, of a barrel extension formed in the inner face of its left-hand wall with a long clearance-slot the rear end of which constitutes an ejecting-shoulder, a breech-block, a locking-block mounted therein and coacting with the barrel extension, an extractor mounted in the right-hand side of the forward end of the breech-block, a spring-actuated combined extractor and ejector mounted in the left-hand side of the forward end of the breech-block and adapted to coact with the said ejecting-shoulder of the barrel extension and downwardly offset at its rear end to clear the forward end of the said locking-block, and a breech-block detent for holding the breech-block when the said ejecting-shoulder of the barrel extension is coacting with the said combined part.

14. In a firearm, the combination with a tubular magazine, of a breech-block, a cartridge-controller formed independently of the said block and applied to the lower face thereof and comprising a cartridge-stop located at its rear end and cartridge-cut-off-operating lug located at its forward end, and a spring-operated cartridge cut-off operating at the mouth of the said magazine, the said stop and lug being arranged as to their separation from each other so that the cartridge-stop will secure the time required for the movement of the cartridge cut-off from its retired position into its operating position at the beginning of the rearward movement of the breech-block.

15. In a firearm, a cartridge-controller adapted to be applied to the lower face of the breech-block of the arm and made in one piece and comprising a cartridge-stop located at its rear end and a cartridge-cut-off-operating lug located at its forward end.

16. In a firearm, the combination with a breech-block having its lower face formed with a recess, of a cartridge-controller located in the said recess and comprising a cartridge-stop and a cartridge-cut-off-operating lug, and a spring-actuated plunger-pin mounted in the breech-block and engaging with the said cartridge-controller for holding it in place.

17. In a magazine-firearm, the combination with a gun-frame having a shallow recess in the inner face of one of its side walls with a crescent-shaped undercut leading out of the rear end of the said recess, of a tubular magazine and a plate-like cartridge cut-off located in the said recess, operating at the mouth of the said magazine and having its rear end furnished with a crescent-shaped bearing and retaining rib entering the said crescent-shaped undercut.

18. In a magazine-firearm, the combination with the gun-frame thereof, of a recoiling barrel, barrel extension and breech-block, and a breech-block detent turning upon its forward end and adapted at its rear end to engage directly with the forward end of the breech-block for temporarily detaining the same at the limit of its rearward movement, and also adapted at its rear end to be directly engaged by the rear portion of the barrel extension at the end of the forward movement thereof for releasing the breech-block which then moves forward.

19. In a magazine-firearm, the combination with a gun-frame having an undercut recess formed in the inner face of one of its side walls, of a recoiling barrel, barrel extension and breech-block, and a breech-block detent located in the said recess and formed at its rear and forward ends with retaining-ribs which enter undercuts leading out of the forward and rear ends of the said recess, and the said detent engaging with the breech-block for temporarily detaining the same at the limit of its rearward excursion and being engaged by the barrel extension when the same is nearing the limit of its forward movement, for releasing the breech-block.

20. In a magazine-firearm, the combination with a breech-block, of a locking-block mounted therein, a breech-block-closing spring, a breech-block-operating rod connected at its forward end with the said locking-block and at its rear end acted upon by the said spring, a hammer, a sear, and a trigger; and timing devices coacting with the sear and trigger and controlled in their operation by the said rod.

21. In a magazine-firearm, the combination with a breech-block, of a locking-block mounted therein, a breech-block-closing spring, and a breech-block-operating rod connected at its forward end with the said locking-block and at its rear end acted upon by the breech-block-closing spring, a hammer, a sear and a trigger; and timing devices controlled by the said rod and comprising a timing-rocker and a timing-rod which latter bridges a gap between the trigger and the sear.

22. In a magazine-firearm, the combination with a breech-block, of a locking-block mounted therein, a breech-block-closing spring, a breech-block-operating rod connected at its forward end with the said locking-block and at its rear end acted upon by the said spring, a hammer, a sear and a trigger; and timing devices comprising a timing-follower interposed between the said rod and spring, a timing-rocker coacting with the said follower and rod, and a timing-rod pivoted at its rear end to the said rocker and having its forward end loosely connected with the trigger and coacting with the sear to temporarily connect the trigger and the sear for the operation of the latter.

23. In a magazine-firearm, the combination with a breech-block, of a locking-block mounted therein, a breech-block-closing spring, a breech-block-operating rod connected at its forward end with the said locking-block and acted upon at its rear end by the said spring; a hammer, a sear, and a trigger; and timing devices comprising a timing-follower interposed between the said spring and follower and means connecting the said follower and trigger.

24. In a take-down gun, the combination with the gun-frame thereof, of a pivotal cartridge-carrier mounted therein, a guard-frame having sliding take-down connection with the gun-frame and having its main or body portion formed with a spring-socket opening upwardly, a coiled carrier-spring located in the said socket, a plunger also located in the said socket from which it projects above the face of the said main or body portion of the guard-frame in position to be engaged by the rear end of the carrier and crowded downward when the gun-frame and guard-frame are slid together in putting the gun together as a take-down gun, whereby the carrier-spring is placed under tension by the act of putting the gun together.

25. In a take-down gun, the combination with a gun-frame, of a guard-frame made independent thereof and having an integral chambered upper tang, a breech-block mounted in the gun-frame, a breech-block-closing spring located in the chamber of the said tang, a breech-block-operating rod connected at its forward end with the breech-block and coacting at its rear end with the said spring for which purpose its rear end enters the said chambered tang when the gun is put together, and means for holding the said spring in the said chamber when the gun is taken apart.

26. In a tubular-magazine take-down gun, the combination with a gun-frame having in its bottom a long opening the forward portion of which forms a loading-opening, and longitudinal locking-grooves formed in the inner faces of the side walls of the said frame to the rear of the loading end of the said opening, of a guard-frame the forward end of which enters the rear portion of the said long opening and is formed with longitudinal locking-ribs adapted to slide into the said grooves, and means for connecting the upper portions of the two frames when the said ribs are entered into the said grooves.

27. In a take-down gun, the combination with a gun-frame carrying a recoiling barrel, barrel extension, breech-block, and a breech-block-operating rod connected at its forward end with the breech-block and forming one self-contained part of the take-down structure; of a guard-frame made independent of the said gun-frame, having an integral chambered upper tang and carrying a hammer mechanism, and a breech-block-closing spring located in the chamber of the said tang and forming the other self-contained part of the take-down structure, and a take-down device for coupling the said two self-contained structures together at which time the two organizations are functionally united by the said rod which, when the gun is put together, enters the said chambered tang and coacts with the spring therein.

28. In a tubular-magazine take-down gun, the combination with a gun-frame the bottom of which has a long opening the forward end of which serves as a loading-opening and the rear end of which receives the guard-frame, the inner faces of the side walls of the said frame being formed with longitudinal grooves and with locking-ledges forming rearward extensions of the upper walls of the said grooves which are located adjacent to the forward end of that portion of the long opening which receives the guard-frame; of a guard-frame having the forward end of its main or body portion provided with longitudinal locking-ribs to enter the said grooves and to bear upon the said ledges and the said ribs being beveled at their forward ends to permit the two frames to be tilted with respect to each other after they have been started apart in taking the gun down.

29. In a tubular-magazine take-down gun, the combination with a gun-frame carrying a recoiling barrel, barrel extension, breech-block and a breech-block mechanism, the latter including a rearwardly-extending breech-block-operating rod; of a guard-frame made independent of the gun-frame and carrying a hammer mechanism and comprising a lower tang and an upper tang both made integral with it and the latter being chambered to receive the said rod when the gun is put together; and a take-down screw to draw and bind the two frames together where their upper portions meet, the said gun-frame and guard-frame constituting two self-contained structures functionally united by the said rod.

30. In a take-down gun, the combination with a gun-frame, of a recoiling barrel and barrel extension, a breech-block, a rearwardly-extending breech-block-operating rod, a guard-frame having a chambered upper tang made integral with it, a breech-block-closing spring located in the said tang, a hammer mechanism mounted in the said guard-frame, a timing-follower interposed between the said spring and the said rod, and timing devices mounted in the guard-frame, controlling the said hammer mechanism and operated by the said timing-follower.

31. In a take-down gun, the combination with a gun-frame, of a recoiling barrel and barrel extension, a breech-block, a rearwardly-extending breech-block-operating rod, a guard-frame having a chambered upper tang made integral with it, a hammer mechanism mounted in the said guard-frame, a breech-block-closing spring located in the said chambered tang, a timing-follower interposed between the said spring and rod, and timing devices mounted in the guard-frame, controlling the said hammer mechanism and themselves controlled by the said follower and by the lower edge of the said rod.

32. In a take-down gun, the combination with a gun-frame, of a recoiling barrel, barrel extension and breech-block, a rearwardly-extending breech-block-operating rod, a guard-frame having a chambered upper tang formed integral with it, a hammer mechanism mounted in the said guard-frame, a breech-block-closing spring located in the said chambered tang, a follower interposed between the said spring and rod, a timing-rocker mounted in the guard-frame and coacting with the said follower and rod, and a timing-rod operated by the timing-follower and coacting with the hammer mechanism.

33. In a take-down gun, the combination with a gun-frame having a long opening formed in its bottom and having a shallow carrier stop-groove formed in the inner face of one of its side walls, of a pivotal carrier formed at its forward end with a stop boss or projection normally located in the said groove and engaging with the bottom wall thereof to prevent the carrier from dropping down out of the said opening when the gun is taken down, the said carrier being adapted to be sprung laterally to disengage the said boss or projection from the said wall when the gun is put together and it is desired to pull the forward end of the carrier down through the said opening for access to the carrier.

34. In a firearm, the combination with the gun-frame, of a recoiling barrel and barrel extension, a guide or support depending from the barrel, a barrel-closing spring, a tubular magazine mounted at its rear end in the said gun-frame, provided with a stop-shoulder coacting with the said guide or support to stop the barrel as it is returned to its normal position by the said spring, and the said magazine being also provided with a take-down flange located in front of the said stop-shoulder; and a fore-stock supported at its rear end by the gun-frame and at its forward end by the said take-down flange and chambered to clear the said stop-shoulder of the magazine in assembling and dismembering the gun.

35. In a recoil-operated tubular-magazine gun, the combination with the frame thereof, of a recoiling barrel, a recoiling barrel extension mounted in the said frame and having the said recoiling barrel screwed into it, a tubular magazine removably mounted in the said frame, a fore-stock supported at its rear end by the said frame, a take-down flange located upon the forward end of the magazine, supporting the forward end of the fore-stock and providing for engaging the magazine to screw it into and unscrew it from the said gun-frame, and means carried by the recoiling barrel and magazine for stopping the forward movement of the recoiling barrel after recoil independently of the said take-down flange.

36. In a recoil-operated gun, the combination with a recoiling barrel and barrel extension, of a breech-block, a breech-block-operating rod extending rearwardly therefrom, a breech-block-closing spring coacting with the said rod which during recoil makes frictional engagement with a non-recoiling part of the gun structure, whereby a friction-brake is formed for slowing down the recoil.

37. In a firearm, the combination with a gun-frame having the lower portion of its front end formed with an internally-threaded socket and with a groove, of a recoiling barrel and barrel extension, a guide-ring depending from the said barrel, a coiled barrel-closing spring interposed between the gun-frame and the rear edge of the said guide-ring, a tubular magazine passing from front to rear through the said guide-ring and spring and having its rear end threaded to enter the said socket and its forward end provided with a fixed collar or shoulder having its rear face formed with a recess and also provided with a stop-shoulder located in front of the said ring with which it coacts to stop the barrel as the same is returned to its normal position by the said spring; and a fore-stock chambered throughout its length to clear the said stop-shoulder on the magazine and having its rear end formed with a tenon to enter the said groove in the gun-frame, and its front end formed with a tenon to enter the recess in the fixed shoulder or collar at the front end of the magazine, whereby the fore-stock is entirely cleared from the body of the magazine and solely supported against sidewise and endwise movement by the gun-frame, and the shoulder or collar at the forward end of the magazine.

38. In a magazine-firearm, the combination with a breech-block, of a locking-block therefor, and a breech-block-operating rod pivotally connected at its forward end to the said locking-block and during recoil engaging with a part of the gun whereby it is crowded downward and acts to draw the locking-block down into its unlocked position.

39. A tubular-magazine firearm having its tubular magizine formed at its rear end with screw-threads by means of which it is removably mounted in the gun-frame and provided at its front end with a fixed take-down flange by means of which the magazine is engaged for being screwed into and unscrewed from the gun-frame.

40. In a recoil-operated tubular-magazine gun, the combination with the frame thereof, of a recoiling barrel, a recoiling barrel extension mounted in the gun-frame and having the recoiling barrel screwed into it, a tubular magazine provided at its rear end with threads for being removably mounted in the gun-frame and at its front end with a fixed take-down flange by means of which the magazine is engaged for being screwed into and unscrewed from the said frame, means for stopping the barrel at the limit of its forward movement, and a fore-stock supported at its rear end by the gun-frame and at its forward end by the said take-down flange.

In testimony whereof I have signed this specification in the presence of two subscribing witnesses.

THOMAS C. JOHNSON.

Witnesses:
FREDERIC C. EARLE,
CLARA L. WEED.